(12) United States Patent
Choi et al.

(10) Patent No.: US 10,454,132 B2
(45) Date of Patent: Oct. 22, 2019

(54) ELECTRODE ASSEMBLY INCLUDING BI-CELL AND FULL-CELL AND SECONDARY BATTERY INCLUDING THE SAME

(71) Applicant: LG CHEM, LTD., Seoul (KR)

(72) Inventors: Hyoungsik Choi, Daejeon (KR); Sang Baek Ryu, Daejeon (KR); Chan Ki Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 266 days.

(21) Appl. No.: 15/505,512

(22) PCT Filed: Oct. 22, 2015

(86) PCT No.: PCT/KR2015/011188
§ 371 (c)(1),
(2) Date: Feb. 21, 2017

(87) PCT Pub. No.: WO2016/068544
PCT Pub. Date: May 6, 2016

(65) Prior Publication Data
US 2017/0207481 A1    Jul. 20, 2017

(30) Foreign Application Priority Data
Oct. 31, 2014  (KR) .................. 10-2014-0150096

(51) Int. Cl.
| | | |
|---|---|---|
| *H01M 10/04* | (2006.01) | |
| *H01M 2/02* | (2006.01) | |
| *H01M 2/14* | (2006.01) | |
| *H01M 10/052* | (2010.01) | |
| *H01M 10/0583* | (2010.01) | |
| *H01M 10/12* | (2006.01) | |
| *H01M 10/28* | (2006.01) | |
| *H01M 10/38* | (2006.01) | |
| *H01M 10/0585* | (2010.01) | |
| *H01M 10/0525* | (2010.01) | |

(52) U.S. Cl.
CPC ..... *H01M 10/0459* (2013.01); *H01M 2/0287* (2013.01); *H01M 2/14* (2013.01); *H01M 10/044* (2013.01); *H01M 10/0418* (2013.01); *H01M 10/052* (2013.01); *H01M 10/0583* (2013.01); *H01M 10/12* (2013.01); *H01M 10/28* (2013.01); *H01M 10/38* (2013.01); *H01M 10/0525* (2013.01); *H01M 10/0585* (2013.01)

(58) Field of Classification Search
CPC ......... H01M 10/0459; H01M 10/0583; H01M 10/044; H01M 10/0418; H01M 2/0287
See application file for complete search history.

(56) References Cited

U.S. PATENT DOCUMENTS

| | | |
|---|---|---|
| 2002/0160258 A1 | 10/2002 | Lee et al. |
| 2010/0279161 A1 | 11/2010 | Kang et al. |
| 2010/0304198 A1 | 12/2010 | Ahn et al. |
| 2011/0052964 A1* | 3/2011 | Kim .................. H01M 2/1673 429/152 |

FOREIGN PATENT DOCUMENTS

| | | |
|---|---|---|
| CN | 1363122 A | 8/2002 |
| CN | 101796684 A | 8/2010 |
| KR | 10-2009-0064021 A | 6/2009 |
| KR | 10-2010-0129142 A | 12/2010 |
| KR | 10-2012-0019217 A | 3/2012 |
| KR | 10-2014-0035646 A | 3/2014 |
| KR | 10-2014-0062568 A | 5/2014 |

OTHER PUBLICATIONS

International Search Report for PCT/KR2015/011188 (PCT/ISA/210) dated Feb. 2, 2016.

* cited by examiner

*Primary Examiner* — Ladan Mohaddes
(74) *Attorney, Agent, or Firm* — Mintz Levin Cohn Ferris Glovsky and Popeo, P.C.; Kongsik Kim; Jhongwoo Jay Peck

(57) ABSTRACT

Disclosed herein is a stacked/folded type electrode assembly configured to have a structure in which a plurality of unit cells, each of which includes a positive electrode having an electrode mixture including an electrode active material applied to a current collector, a negative electrode having an electrode mixture including an electrode active material applied to a current collector, and a separator disposed between the positive electrode and the negative electrode, is wound in the state of being arranged on a sheet type separation film, wherein the unit cells include one full cell and three or more bi-cells, the outermost unit cells of the electrode assembly are each configured such that an electrode forming the outside of the electrode assembly is configured as a single-sided electrode, in which no electrode mixture is applied to the surface of the current collector facing the outside of the electrode assembly, and the single-sided electrodes are electrodes having the same polarity.

16 Claims, 6 Drawing Sheets

ELECTRODE ASSEMBLY INCLUDING BI-CELL AND FULL-CELL AND SECONDARY BATTERY INCLUDING THE SAME

CROSS-REFERENCE TO RELATED APPLICATIONS

This application claims the benefit of Korean Patent Application No. 10-2014-0150096 filed on Oct. 31, 2014 with the Korean Intellectual Property Office, the disclosure of which is herein incorporated by reference in its entirety.

TECHNICAL FIELD

The present invention relates to an electrode assembly including a bi-cell and a full-cell and a secondary battery including the same.

BACKGROUND ART

As mobile devices have been continuously developed and the demand for such mobile devices has increased, the demand for secondary batteries has also sharply increased as an energy source for such mobile devices. Accordingly, much research into batteries satisfying various needs has been carried out.

Typically, in terms of the shape of batteries, the demand for prismatic secondary batteries or pouch-shaped secondary batteries that are thin enough to be applied to products, such as cellular phones, is very high. In terms of the material for batteries, on the other hand, the demand for lithium secondary batteries, such as lithium ion batteries and lithium ion polymer batteries, which exhibit high energy density, discharge voltage, and output stability, is also very high.

In addition, secondary batteries may be classified based on the shape of a battery case of each of the secondary batteries into a cylindrical battery, configured to have a structure in which an electrode assembly is mounted in a cylindrical metal container, a prismatic battery, configured to have a structure in which an electrode assembly is mounted in a prismatic metal container, and a pouch-shaped battery, configured to have a structure in which an electrode assembly is mounted in a pouch-shaped case made of a laminated aluminum sheet.

Particularly, in recent years, a lot of interest has been directed to a pouch-shaped battery configured to have a structure in which a stacked or stacked/folded type electrode assembly is mounted in a pouch-shaped battery case made of a laminated aluminum sheet because of low manufacturing costs, light weight, easy modification of the shape thereof, etc. In addition, the use of such a pouch-shaped battery has gradually increased.

Furthermore, secondary batteries may be classified based on the structure of an electrode assembly, which has a structure in which a positive electrode and a negative electrode are stacked in the state in which a separator is interposed between the positive electrode and the negative electrode. Typically, the electrode assembly may be configured to have a jelly-roll (wound) type structure in which a long sheet type positive electrode and a long sheet type negative electrode are wound in the state in which a separator is disposed between the positive electrode and the negative electrode or a stacked type structure in which a plurality of positive electrodes and a plurality of negative electrodes, each of which has a predetermined size, are sequentially stacked in the state in which a plurality of separators is disposed respectively between the positive electrodes and the negative electrodes. In recent years, in order to solve problems with the jelly-roll type electrode assembly and the stacked type electrode assembly, there has been developed a stacked/folded type electrode assembly, which is a combination of the jelly roll type electrode assembly and the stacked type electrode assembly, having an improved structure in which a predetermined number of positive electrodes and a predetermined number of negative electrodes are sequentially stacked in the state in which a predetermined number of separators are disposed respectively between the positive electrodes and the negative electrodes to constitute a unit cell, after which a plurality of unit cells is sequentially folded in the state of being placed on a separation film.

Figure 1:
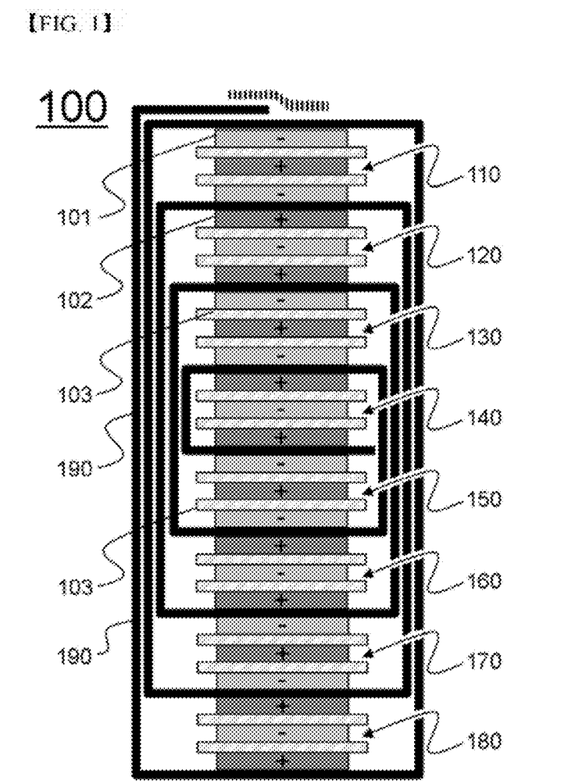
FIG. 1 is a view schematically showing the general structure of a conventional stacked/folded type electrode assembly.

FIG. 1 is a view schematically showing a general structure of a conventional representative stacked/folded type electrode assembly.

Referring to FIG. 1, an electrode assembly 100 includes a combination of unit cells 110, 130, 150, and 170, each of which is configured to have a structure in which a negative electrode 101, a separator 103, a positive electrode 102, another separator 103, and another negative electrode 101 are sequentially stacked, and unit cells 120, 140, 160, and 180, each of which is configured to have a structure in which a positive electrode 102, a separator 103, a negative electrode 101, another separator 103, and another positive electrode 102 are sequentially stacked. A separation film 190, which is interposed between the unit cells 110, 120, 130, 140, 150, 160, 170, and 180 of the electrode assembly 100, surrounds side surfaces of the unit cells 110, 120, 130, 140, 150, 160, 170, and 180 at which no electrode terminals are formed.

The electrode assembly 100 is manufactured by winding the separation film 190 in the state in which the unit cells 110, 120, 130, 140, 150, 160, 170, and 180 are arranged on the separation film 190. Consequently, the electrode assembly 100 includes a total of 12 negative electrodes 101, a total of 12 positive electrodes 102, a total of 16 separators 103, and one separation film 190.

In the case in which electrodes having the same polarity are located at opposite ends of each of the unit cells, however, the electrode assembly has a vertically asymmetrical structure, since electrodes having different polarities are located at opposite ends of the electrode assembly, i.e. the outermost electrodes of the electrode assembly are constituted by a positive electrode and a negative electrode. In the case in which the electrode assembly has a vertically asymmetrical structure, the results of nail penetration tests at the opposite ends of the electrode assembly are different from each other, with the result that the safety of a battery cell including the electrode assembly may be reduced. In addition, it is necessary to modify the structure of a battery case, into which the electrode assembly is inserted, depending on the direction in which the electrode assembly is inserted into the battery case, since the external appearance of the electrode assembly is asymmetrical.

Furthermore, active materials are applied to opposite surfaces of a current collector that constitutes each of the outermost electrodes of the electrode assembly. When the battery cell is broken by a conductive material, such as a metallic material, therefore, the active materials come into direct contact with the conductive material, with the result that a short circuit may occur in the battery cell, whereby the battery cell may catch fire or explode.

Therefore, there is a high necessity for a battery cell configured to have a structure in which the outermost electrodes of an electrode assembly are constituted by electrodes having the same polarity in the case in which an even number of unit cells are used, with the result that the electrode assembly can be inserted into a battery case irrespective of the direction in which the electrode assembly is inserted into a battery case, the external appearance of the electrode assembly is symmetrical, and the results of nail penetration tests at the opposite ends of the electrode assembly are the same.

DISCLOSURE

Technical Problem

The present invention has been made to solve the above problems and other technical problems that have yet to be resolved.

As a result of a variety of extensive and intensive studies and experiments to solve the problems as described above, the inventors of the present application have found that, in the case in which an electrode assembly including 2n unit cells, e.g. four or more even-numbered unit cells, is configured such that a 2n-th unit cell or a (2n−1)-th unit cell located at a winding end point of a separation film is configured as a full cell, as will be described hereinafter, the outermost electrodes of the electrode assembly have the same polarity, with the result that it is not necessary to modify the structure of a battery case, into which the electrode assembly is inserted, depending on the direction in which the electrode assembly is inserted into the battery case, and the results of safety tests, such as nail penetration tests, at the opposite ends of the electrode assembly are the same, whereby it is possible to solve problems with the conventional art.

In addition, the outermost electrodes of the electrode assembly are configured as single-sided electrodes, in each of which no electrode mixture is applied to the outer surface of a current collector facing the outside of the electrode assembly, with the result that it is possible to prevent the occurrence of a short circuit in the battery cell, thereby preventing spike current from flowing in the battery cell and preventing the battery cell from catching fire or exploding when external impact is applied to the battery cell, whereby it is possible to improve the safety of the battery cell.

Technical Solution

In accordance with one aspect of the present invention, the above and other objects can be accomplished by the provision of a stacked/folded type electrode assembly configured to have a structure in which a plurality of unit cells, each of which includes a positive electrode having an electrode mixture including an electrode active material applied to a current collector, a negative electrode having an electrode mixture including an electrode active material applied to a current collector, and a separator disposed between the positive electrode and the negative electrode, is wound in the state of being arranged on a sheet type separation film, wherein the unit cells include one full cell and three or more bi-cells, the outermost unit cells of the electrode assembly are each configured such that an electrode forming the outside of the electrode assembly is configured as a single-sided electrode, in which no electrode mixture is applied to the surface of the current collector facing the outside of the electrode assembly, and the single-sided electrodes are electrodes having the same polarity.

The electrode assembly according to the present invention may include an even number of unit cells. In the case in which a 2n-th unit cell or a (2n−1)-th unit cell located at a winding end point of the separation film, among the unit cells, is configured as a full cell and the other unit cells are configured as A-type bi-cells and C-type bi-cells, the electrode assembly completed by winding the separation film may be configured such that the outermost electrodes of the electrode assembly have the same polarity.

Consequently, it is possible solve the problems with a conventional electrode assembly, which is configured to have an asymmetric structure in which the outermost electrodes of the electrode assembly have different polarities, i.e. the outermost electrodes of the electrode assembly are constituted by a positive electrode and a negative electrode, in that the results of nail penetration tests at the opposite ends of the electrode assembly are different from each other and in that design of the battery cell is difficult during the manufacture of the battery cell.

Hereinafter, the construction of the electrode assembly according to the present invention will be described in more detail.

In a concrete example, the electrode assembly may include four or more even-numbered unit cells. The unit cells may be sequentially arranged on the separation film in a plane. For example, the electrode assembly may include a total of 2n unit cells from a unit cell that is located at a winding start point of the separation film (i.e. a first unit cell) to a unit cell that is located at a winding end point of the separation film (i.e. a 2n-th unit cell (where n is an integer that satisfies $2 \leq n \leq 20$)).

In addition, the electrode assembly according to the present invention may include one full cell and three or more bi-cells as unit cells. The full cell is configured to have a structure in which electrodes having different polarities are located at opposite ends of the unit cell. The full cell may be a first full cell, which is configured to have a structure in which a first positive electrode, configured as a single-sided positive electrode, a separator, and a negative electrode are sequentially stacked, or a second full cell, which is configured to have a structure in which a first negative electrode, configured as a single-sided negative electrode, a separator, and a positive electrode are sequentially stacked. The first positive electrode or the first negative electrode may face the separation film.

In addition, each of the bi-cells is configured to have a structure in which electrodes having the same polarity are located at opposite ends of the unit cell. Each of the bi-cells may be an A-type bi-cell, which is configured to have a structure in which a positive electrode, a negative electrode, and another positive electrode are sequentially stacked in the state in which separators are disposed therebetween, or a C-type bi-cell, which is configured to have a structure in which a negative electrode, a positive electrode, and another negative electrode are sequentially stacked in the state in which separators are disposed therebetween.

The outermost electrodes constituting the unit cells located at the opposite ends of the electrode assembly, i.e. the outermost unit cells, among the bi-cells, i.e. the electrodes which form the outer surface of the electrode assembly, may be configured as single-sided electrodes, in each of which no electrode mixture is applied to the surface of a current collector facing the outside of the electrode assembly.

Consequently, the A-type bi-cell may include a 1A-type bi-cell, which is configured to have a structure in which a first positive electrode, configured as a single-sided positive electrode, a negative electrode, and a positive electrode are sequentially stacked in the state in which separators are disposed therebetween, or a 2A-type bi-cell, which is configured to have a structure in which a positive electrode, a negative electrode, and another positive electrode are sequentially stacked in the state in which separators are disposed therebetween. In addition, the C-type bi-cell may include a 1C-type bi-cell, which is configured to have a structure in which a first negative electrode, configured as a single-sided negative electrode, a positive electrode, and a negative electrode are sequentially stacked in the state in which separators are disposed therebetween, or a 2C-type bi-cell, which is configured to have a structure in which a negative electrode, a positive electrode, and another negative electrode are sequentially stacked in the state in which separators are disposed therebetween.

In the electrode assembly according to the present invention, the first unit cell, which is located at the winding start point of the separation film, may be configured as any one selected from between an A-type bi-cell and a C-type bi-cell. In addition, one of the outermost unit cells of the electrode assembly may be a full cell and the other of the outermost unit cells of the electrode assembly may be a bi-cell such that the electrode assembly is configured to have a symmetric structure in which the outermost electrodes have the same polarity.

Specifically, in the case in which the 2n-th unit cell, which is one of the outermost unit cells of the electrode assembly, is a bi-cell and the (2n−1)-th unit cell, which is the other of the outermost unit cells of the electrode assembly, is a full cell, the 2n-th unit cell may be configured as a 1A-type bi-cell, and the (2n−1)-th unit cell may be configured as a first full cell. Alternatively, the 2n-th unit cell may be configured as a 1C-type bi-cell, and the (2n−1)-th unit cell may be configured as a second full cell.

In addition, in the case in which the 2n-th unit cell, which is one of the outermost unit cells of the electrode assembly, is a full cell and the (2n−1)-th unit cell, which is the other of the outermost unit cells of the electrode assembly, is a bi-cell, the 2n-th unit cell may be configured as a first full cell, and the (2n−1)-th unit cell may be configured as a 1A-type bi-cell. Alternatively, the 2n-th unit cell may be configured as a second full cell, and the (2n−1)-th unit cell may be configured as a 1C-type bi-cell.

In the stacked/folded type electrode assembly, which is completed by winding the separation film, on which the unit cells are arranged as described above, the outermost electrodes may have the same polarity. In addition, the outermost electrodes may be configured as single-sided electrodes, in each of which no electrode mixture is applied to the outer surface of a current collector facing the outside of the electrode assembly. Each of the outermost electrodes of the outermost unit cells may be configured as a first positive electrode or a first negative electrode.

In a concrete example, a battery cell according to the present invention may be manufactured by placing the electrode assembly with the above-stated construction in a battery case. The battery case may be configured to have a structure including a cylindrical or prismatic container and a cap mounted to the open upper end of the container. However, the present invention is not limited thereto. The battery case may be a pouch-shaped case made of a laminate sheet including a resin layer and a metal layer.

Meanwhile, the kind of battery cell according to the present invention is not particularly restricted. In a concrete example, the battery cell according to the present invention may be a lithium secondary battery, such as a lithium ion battery or a lithium ion polymer battery, which exhibits high energy density, discharge voltage, and output stability.

In accordance with another aspect of the present invention, there is provided a battery pack including the secondary battery according to the present invention as a unit cell. The battery pack may be constituted by a battery cell used as a power source for a small-sized device. Alternatively, the battery pack may be constituted by a middle or large-sized battery module including a plurality of battery cells used as a power source for a middle or large-sized device requiring the ability to withstand high temperature, a long cycle, high rate characteristics, etc.

Specifically, the device may be any one selected from among a mobile electronic device, a power tool driven by a battery-powered motor, an electric automobile, such as such as an electric vehicle (EV), a hybrid electric vehicle (HEV), or a plug-in hybrid electric vehicle (PHEV), an electric two-wheeled vehicle, such as an electric bicycle (E-bike) or an electric scooter (E-scooter), an electric golf cart, and a power storage system. However, the present invention is not limited thereto.

The above-mentioned devices and/or apparatuses are well known in the art to which the present invention pertains, and therefore a detailed description thereof will be omitted.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 2:
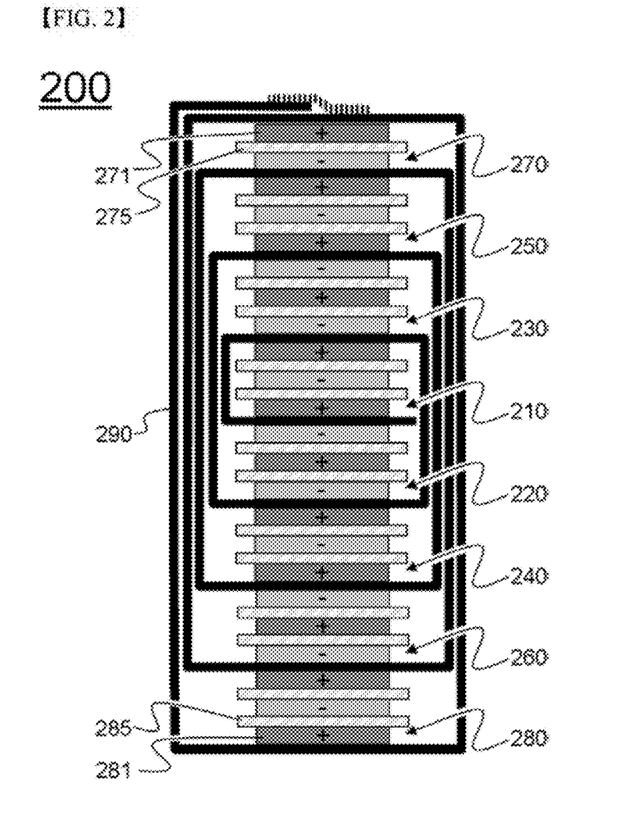
FIG. 2 is a view schematically showing the structure of an electrode assembly according to an embodiment of the present invention.
Figure 3:
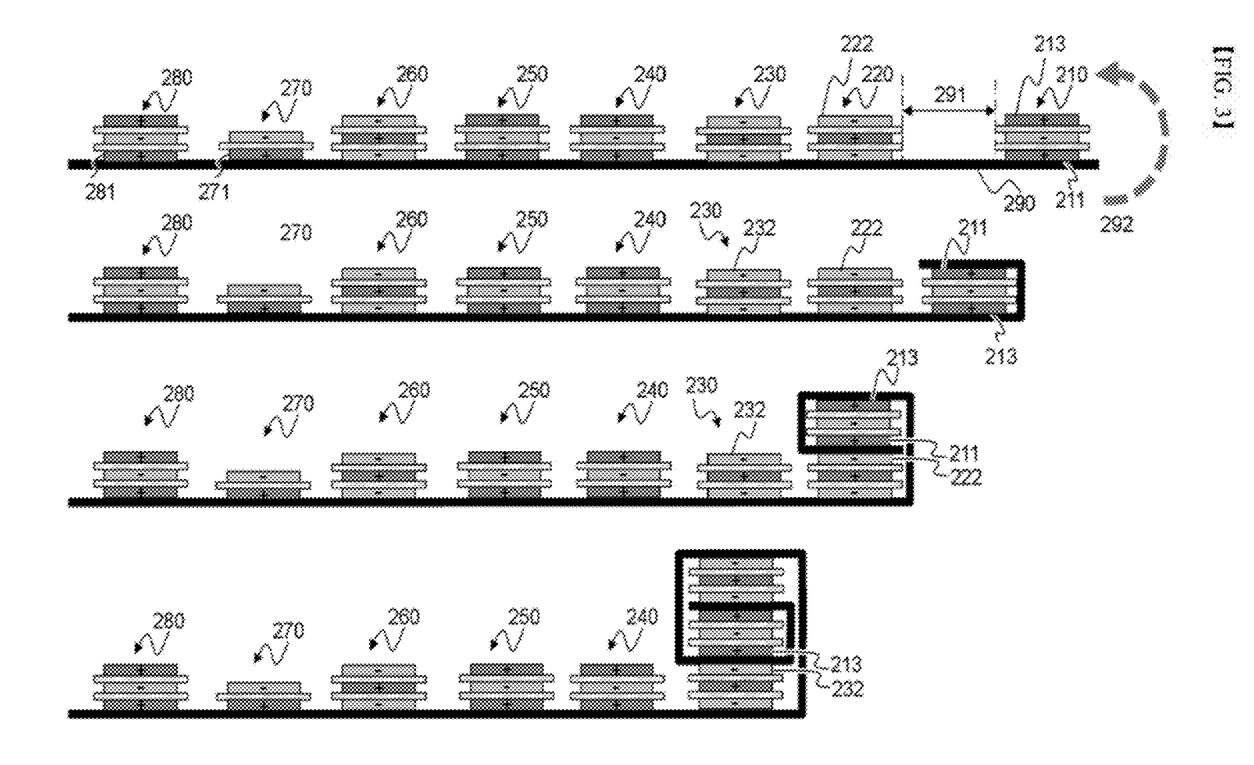
FIG. 3 is a view schematically showing the state in which unit cells are placed on a separation film in order to manufacture the electrode assembly of FIG. 2.

FIG. 2 is a view schematically showing the structure of an electrode assembly according to an embodiment of the present invention, and FIG. 3 is a view schematically showing the state in which four kinds of unit cells are placed on a separation film in order to manufacture the electrode assembly of FIG. 2.

Referring to FIGS. 2 and 3, an electrode assembly 200 is manufactured by arranging unit cells 210, 220, 230, 240, 250, 260, and 280, the outermost electrodes of each of which have the same polarity, and a unit cell 270, the outermost electrodes of which have different polarities, on a separation film 290 such that different electrodes are adjacent to each other in the state in which the separation film 290 is wound and then winding the separation film 290.

The unit cells 210, 220, 230, 240, 250, 260, 270, and 280 are sequentially arranged in the same plane from the first unit cell 210, which is located at the winding start point of the separation film 290, to the eighth unit cell 280, which is located at the winding end point of the separation film 290. The seventh unit cell 270, which is a full cell, faces the separation film 290 in the state in which a positive electrode 271 of the seventh unit cell 270 is located under the separation film 290. The positive electrode 271 of the seventh unit cell 270, which constitutes one of the outermost electrodes of the electrode assembly 200, is a single-sided positive electrode configured such that an active material layer is applied only to one major surface of a positive electrode current collector facing a separator 275 and such that no active material layer is applied to the other major surface of the positive electrode current collector facing the separation film 290. A positive electrode 281 of the eighth unit cell 280, which constitutes the other of the outermost electrodes of the electrode assembly 200, is a single-sided positive electrode, configured such that an active material layer is applied only to one major surface of a positive electrode current collector facing a separator 285 and such that no active material layer is applied to the other major surface of the positive electrode current collector facing the separation film 290.

Meanwhile, the electrode assembly 200 is manufactured by winding the separation film 290 from the first unit cell 210 to the eighth unit cell 280 in the counterclockwise direction 292 such that the first unit cell 210 is located in the middle portion of the electrode assembly 200.

Specifically, at the time of winding the separation film 290, the first unit cell 210 is placed in a region 291 defined between the first unit cell 210 and the second unit cell 220 in the state of being turned upside down. Subsequently, the separation film 290 is wound such that a positive electrode 211 of the first unit cell 210, which has been first located at the lower side of the first unit cell 210, faces a negative electrode 222 of the second unit cell 220, which is located at the upper side of the second unit cell 220, in the state in which the separation film 290 is disposed between the first unit cell 210 and the second unit cell 220.

In addition, the first unit cell 210 and the second unit cell 220, which face each other in the state in which the separation film 290 is disposed between the first unit cell 210 and the second unit cell 220, are simultaneously wound in the state of being arranged on the separation film 290. As a result, a positive electrode 213 of the first unit cell 210, which has been located at the upper side of the first unit cell 210, faces a negative electrode 232 of the third unit cell 230, which is located at the upper side of the third unit cell 230, in the state in which the separation film 290 is disposed between the first unit cell 210 and the third unit cell 230.

The above process is carried out until the eighth unit cell 280 is finally wound. Consequently, the electrode assembly 200 is completed such that the electrode assembly 200 is configured to have a structure in which the first unit cell 210 is located in the middle portion of the electrode assembly 200 and in which the seventh unit cell 270 and the eighth unit cell 280 are located at the opposite ends of the electrode assembly 200.

Figure 4:
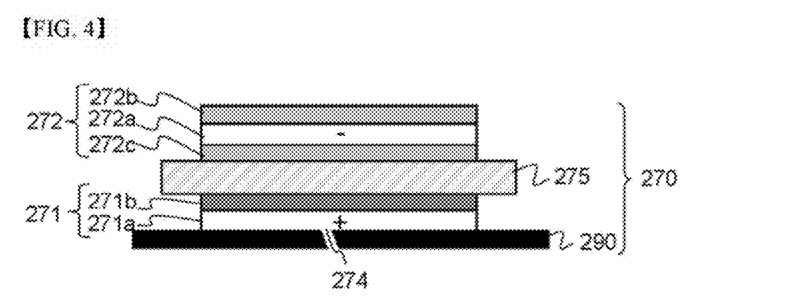
FIG. 4 is a view schematically showing the structure of a full cell that constitutes the electrode assembly of FIG. 2.
Figure 5:
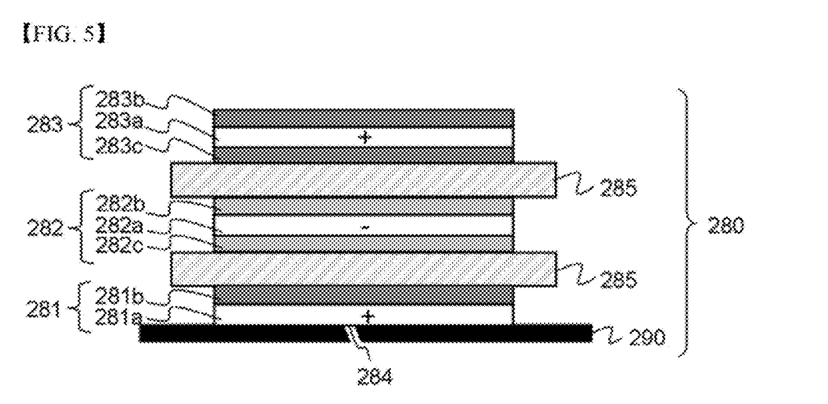
FIG. 5 is a view schematically showing the structures of bi-cells that constitute the electrode assembly of FIG. 2.
Figure 6:
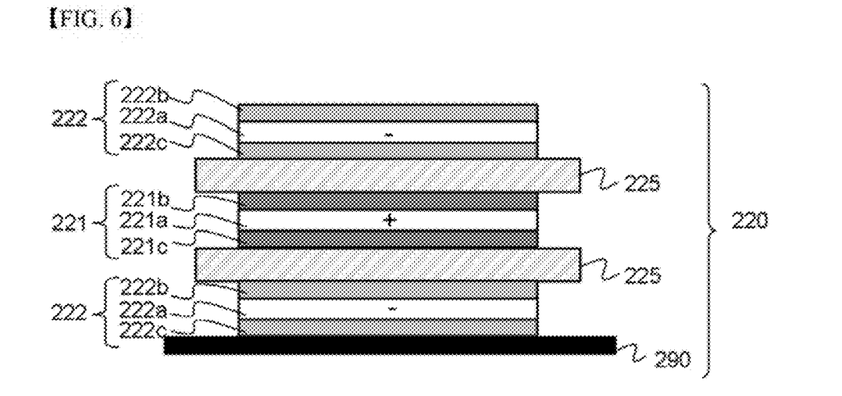
FIG. 6 is a view schematically showing the structure of another bi-cell that constitutes the electrode assembly of FIG. 2.

FIGS. 4 to 6 are views schematically showing the structures of unit cells that constitute the electrode assembly according to the embodiment of the present invention.

FIG. 4 is a view schematically showing a full cell that constitutes the electrode assembly according to the present invention. Referring to FIG. 4, the unit cell 270, which is one of the outermost unit cells of the electrode assembly, is a full cell, which is configured to have a structure in which electrodes having different polarities are located at opposite ends of the unit cell.

The full cell 270 is a first full cell, configured to have a structure in which a first positive electrode 271, which is a single-sided positive electrode, a separator 275, and a negative electrode 272 are sequentially stacked. The first positive electrode 271 faces the separation film 290.

The first positive electrode 271 is a single-sided positive electrode configured such that a positive electrode mixture 271b is applied to one major surface of a positive electrode current collector 271a that faces the separator 275 and such that the positive electrode mixture 271b is not applied to the other major surface 274 of the positive electrode current collector 271a that faces the outside of the electrode assembly. The negative electrode 272 is a double-sided negative electrode configured such that negative electrode active materials 272b and 272c are applied to opposite major surfaces of a negative electrode current collector 272a.

FIGS. 5 and 6 are views schematically showing bi-cells that constitute the electrode assembly according to the present invention.

Referring to FIGS. 5 and 6, each of the bi-cells is configured to have a structure in which electrodes having the same polarity are located at opposite ends of the unit cell. The bi-cells shown in FIG. 5 are A-type bi-cells, each of which is configured to have a structure in which a positive electrode, a separator, a negative electrode, another separator, and another positive electrode are sequentially stacked, and the bi-cell shown in FIG. 6 is an C-type bi-cell, which configured to have a structure in which a negative electrode, a separator, a positive electrode, another separator, and another negative electrode are sequentially stacked.

Specifically, a 1A-type bi-cell 280, which is one of the A-type bi-cells shown in FIG. 5, which is one of the outermost unit cells of the electrode assembly and has a single-sided electrode 281, is configured to have a structure in which a first positive electrode 281, which is a single-sided positive electrode, a negative electrode 282, and a positive electrode 283 are sequentially stacked in the state in which separators 285 are disposed therebetween. A 2A-type bi-cell 210, which is the other of the A-type bi-cells shown in FIG. 5, which is located in the middle portion of the electrode assembly, is configured to have a structure in which a positive electrode 211, a negative electrode 212, and another positive electrode 211 are sequentially stacked in the state in which separators 215 are disposed therebetween.

The first positive electrode 281 is a single-sided positive electrode configured such that a positive electrode mixture 281b is applied to one major surface of a positive electrode current collector 281a that faces the separator 285 and such that the positive electrode mixture 281b is not applied to the other major surface 284 of the positive electrode current collector 281a that faces the outside of the electrode assembly. The positive electrode 211 is a double-sided positive electrode configured such that positive electrode active materials 211*b* are 211*c* are applied to opposite major surfaces of a positive electrode current collector 211*a*, and the positive electrode 283 is a double-sided positive electrode configured such that positive electrode active materials 283*b* and 283*c* are applied to opposite major surfaces of a positive electrode current collector 283*a*. The negative electrode 212 is a double-sided negative electrode, configured such that negative electrode active materials 212*b* are 212*c* are applied to opposite major surfaces of a negative electrode current collector 212*a*, and the negative electrode 282 is a double-sided negative electrode, configured such that negative electrode active materials 282*b* and 282*c* are applied to opposite major surfaces of a negative electrode current collector 282*a*.

In addition, the C-type bi-cell shown in FIG. 6, which is referred to as a 2C-type bi-cell 220, is configured to have a structure in which a negative electrode 222, a positive electrode 221, and another negative electrode 222 are sequentially stacked in the state in which separators 225 are disposed therebetween. The positive electrode 221 is a double-sided positive electrode configured such that positive electrode active materials 221*b* are 221*c* are applied to opposite major surfaces of a positive electrode current collector 221*a*, and the negative electrode 222 is a double-sided negative electrode configured such that negative electrode active materials 222*b* are 222*c* are applied to opposite major surfaces of a negative electrode current collector 222*a*.

In the electrode assembly according to the present invention, as described above, one selected from between the seventh unit cell 270 and the eighth unit cell 280 is configured as a pull-cell and the other selected from between the seventh unit cell 270 and the eighth unit cell 280 is configured as a bi-cell such that the outermost electrodes of the electrode assembly have the same polarity in the state in which the electrode assembly is wound. In addition to the disposition shown in FIG. 3, therefore, the first unit cell 210 may be configured as a bi-cell, and the seventh unit cell 270 may be configured as a pull-cell. In this case, the seventh unit cell 270 is configured as a first pull-cell when the eighth unit cell 280 is configured as a 1A-type bi-cell, and the seventh unit cell 270 is configured as a second pull-cell when the eighth unit cell 280 is configured as a 1C-type bi-cell.

In the above structure, each of the outermost electrodes 271 and 281 of the electrode assembly 200 is constituted by a first positive electrode, which is configured as a single-sided electrode, or a second negative electrode, which is configured as a single-sided electrode. Consequently, the outermost electrodes of the electrode assembly have the same polarity.

Figure 7:
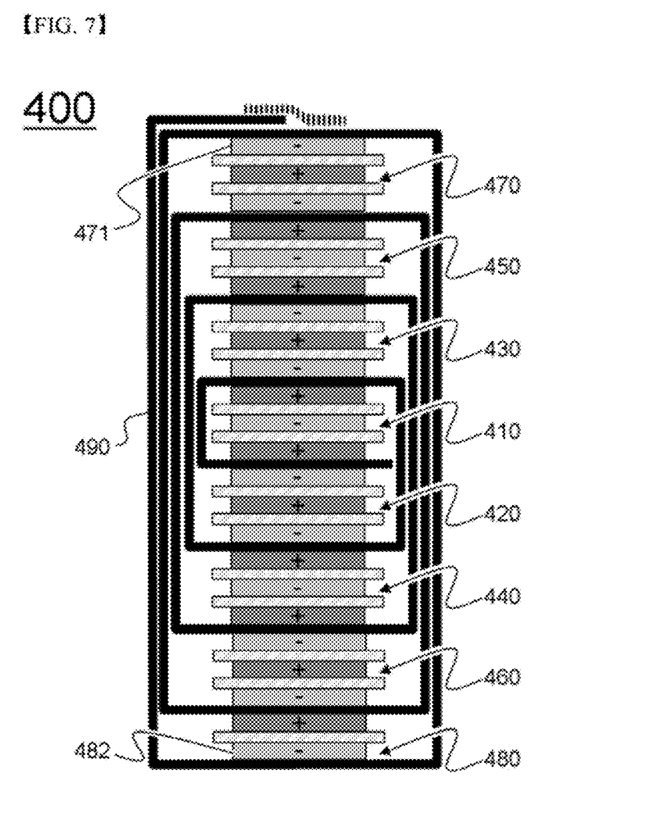
FIG. 7 is a view schematically showing the structure of an electrode assembly manufactured using an electrode assembly manufacturing method according to another embodiment of the present invention.

As another example of the present invention, FIG. 7 is a view schematically showing the structure of an electrode assembly manufactured in the state of being arranged in order that is different from the order shown in FIG. 5.

Referring to FIG. 7, in an electrode assembly 400, a first unit cell 410 is configured as a bi-cell and an eighth unit cell 480 is configured as a full cell. In this case, the eighth unit cell 480 is configured as a second full cell, and a seventh unit cell 470 is configured as a 1C-type bi-cell. Consequently, the outermost electrodes, i.e. electrodes 471 and 482, of the electrode assembly have the same polarity.

Figure 8:
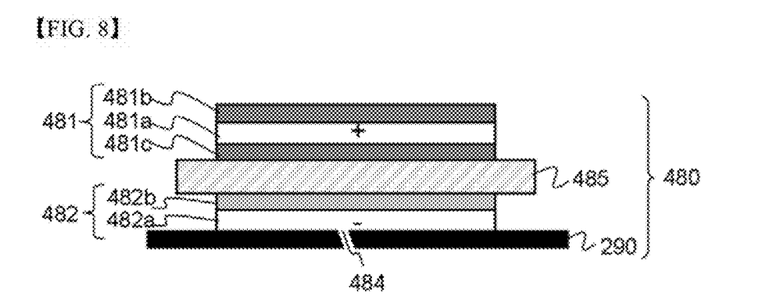
FIG. 8 is a view schematically showing the structure of a full cell that constitutes the electrode assembly of FIG. 7.

FIG. 8 is a view schematically showing a full cell that constitutes the electrode assembly of FIG. 7. Referring to FIG. 8, the unit cell 480, which is one of the outermost electrodes of the electrode assembly, is a full cell configured to have a structure in which electrodes having different polarities are located at opposite ends of the unit cell.

The full cell 480 is a second full cell, which is configured to have a structure in which a first negative electrode 482, which is a single-sided negative electrode, a separator 485, and a positive electrode 481 are sequentially stacked. The first negative electrode 482 faces the separation film 290. The first negative electrode 482 is a single-sided negative electrode configured such that a negative electrode mixture 482*b* is applied to one major surface of a negative electrode current collector 482*a* that faces the separator 485 and such that the negative electrode mixture 482*b* is not applied to the other major surface 484 of the negative electrode current collector 482*a* that faces the outside of the electrode assembly. The positive electrode 481 is a double-sided positive electrode configured such that positive electrode active materials 481*b* are 481*c* are applied to opposite major surfaces of a positive electrode current collector 481*a*.

Figure 9:
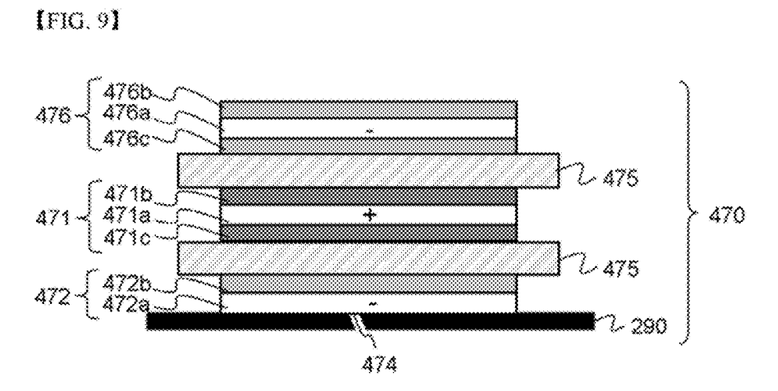
FIG. 9 is a view schematically showing the structure of a bi-cell that constitutes the electrode assembly of FIG. 7.

FIG. 9 is a view schematically showing a bi-cell that constitutes the electrode assembly of FIG. 7.

Referring to FIG. 9, the bi-cell is configured to have a structure in which electrodes having the same polarity are located at opposite ends of the unit cell. The bi-cell shown in FIG. 9 is a C-type bi-cell, configured such that a negative electrode, a separator, a positive electrode, another separator, and another negative electrode are sequentially stacked.

Specifically, the C-type bi-cell shown in FIG. 9, which is referred to as a 1C-type bi-cell 470, which is one of the outermost unit cells of the electrode assembly and has a single-sided electrode 472, is configured to have a structure in which a first negative electrode 472, which is a single-sided negative electrode, a positive electrode 471, and a negative electrode 476 are sequentially stacked in the state in which separators 475 are disposed therebetween.

The first negative electrode 472 is a single-sided negative electrode configured such that a negative electrode mixture 472*b* is applied to one major surface of a negative electrode current collector 472*a* that faces the separator 475 and such that the negative electrode mixture 472*b* is not applied to the other major surface 474 of the negative electrode current collector 472*a* that faces the outside of the electrode assembly. The positive electrode 471 is a double-sided positive electrode configured such that positive electrode active materials 471*b* are 471*c* are applied to opposite major surfaces of a positive electrode current collector 471*a*. The negative electrode 476 is a double-sided negative electrode configured such that negative electrode active materials 476*b* and 476*c* are applied to opposite major surfaces of a negative electrode current collector 476*a*.

In the electrode assembly according to the present invention, as described above, the first unit cell 410 is configured as a bi-cell and the eighth unit cell 480 is configured as a full cell such that the outermost electrodes of the electrode assembly have the same polarity in the state in which the electrode assembly is wound. In this case, the eighth unit cell 480 is configured as a first full cell, and the seventh unit cell 470 is configured as a 1A-type bi-cell. In the case in which the eighth unit cell 480 is configured as a second full cell, the seventh unit cell 470 is configured as a 1C-type bi-cell.

In the above structure, each of the outermost electrodes 471 and 472 of the electrode assembly 400 is constituted by a first negative electrode, which is configured as a single-sided electrode, or a second positive electrode, which is configured as a single-sided electrode. Consequently, the outermost electrodes of the electrode assembly have the same polarity.

In the case in which the electrode assembly is configured to have a symmetrical structure, as described above, it is not necessary to modify the structure of the battery case, into which the electrode assembly is inserted, depending on the direction in which the electrode assembly is inserted into the battery case. In addition, the outermost electrodes of the electrode assembly are configured as single-sided electrodes. Consequently, it is possible to prevent the occurrence of a short circuit in the battery cell, thereby preventing spike current from flowing in the battery cell and preventing the battery cell from catching fire when external impact is applied to the battery cell, whereby it is possible to improve the safety of the battery cell.

INDUSTRIAL APPLICABILITY

As is apparent from the above description, a battery cell according to the present invention includes an electrode assembly including 2n unit cells, e.g. four or more even-numbered unit cells, wherein a 2n-th unit cell or a (2n−1)-th unit cell located at a winding end point of a separation film is configured as a full cell, whereby the outermost electrodes of the electrode assembly have the same polarity. Consequently, it is not necessary to modify the structure of a battery case, into which the electrode assembly is inserted, depending on the direction in which the electrode assembly is inserted into the battery case. In addition, the results of safety tests, such as nail penetration tests, at the opposite ends of the electrode assembly are the same. Consequently, it is possible to solve difficulty in the design of the battery cell, which is caused during the manufacture of the battery cell.

In addition, the outermost electrodes of the electrode assembly are configured as single-sided electrodes, in each of which no electrode mixture is applied to the outer surface of a current collector facing the outside of the electrode assembly. Consequently, it is possible to prevent the occurrence of a short circuit in the battery cell, thereby preventing spike current from flowing in the battery cell and preventing the battery cell from catching fire or exploding when external impact is applied to the battery cell, for example at the time of nail penetration tests, whereby it is possible to improve the safety of the battery cell.

The invention claimed is:

1. An electrode assembly configured to have a structure in which a plurality of unit cells, each of which comprises a positive electrode having an electrode mixture comprising an electrode active material applied to a current collector, a negative electrode having an electrode mixture comprising an electrode active material applied to a current collector, and a separator disposed between the positive electrode and the negative electrode, is wound in a state of being arranged on a sheet type separation film, wherein
the unit cells comprise one full cell and three or more bi-cells,
outermost unit cells of the electrode assembly are each configured such that an electrode forming an outside of the electrode assembly is configured as a single-sided electrode, in which no electrode mixture is applied to a surface of the current collector facing the outside of the electrode assembly,
the single-sided electrodes are electrodes having the same polarity, and
the unit cells are wound in a state in which the unit cells are sequentially arranged in a plane from a first unit cell, which is located at a winding start point of the separation film, to a 2n-th unit cell (where n is an integer that satisfies 2≤n≤20), which is located at a winding end point of the separation film, and
the three or more bi-cells configured as an A-type bi-cell or a C-type bi-cell are alternatingly stacked, and the one full cell is disposed as one of the outermost unit cells.

2. The electrode assembly according to claim 1, wherein the full cell is a first full cell, which is configured to have a structure in which a first positive electrode, configured as a single-sided positive electrode, a separator, and a negative electrode are sequentially stacked, or a second full cell, which is configured to have a structure in which a first negative electrode, configured as a single-sided negative electrode, a separator, and a positive electrode are sequentially stacked, the first positive electrode or the first negative electrode facing the separation film.

3. The electrode assembly according to claim 1, wherein the A-type bi-cell, which is configured to have a structure in which a positive electrode, a negative electrode, and another positive electrode are sequentially stacked in a state in which separators are disposed therebetween, a and the C-type bi-cell, which is configured to have a structure in which a negative electrode, a positive electrode, and another negative electrode are sequentially stacked in a state in which separators are disposed therebetween.

4. The electrode assembly according to claim 3, wherein the A-type bi-cell comprises a 1A-type bi-cell, which is configured to have a structure in which a first positive electrode, configured as a single-sided positive electrode, a negative electrode, and a positive electrode are sequentially stacked in a state in which separators are disposed therebetween, or a 2A-type bi-cell, which is configured to have a structure in which a positive electrode, a negative electrode, and another positive electrode are sequentially stacked in a state in which separators are disposed therebetween.

5. The electrode assembly according to claim 3, wherein the C-type bi-cell comprises a 1C-type bi-cell, which is configured to have a structure in which a first negative electrode, configured as a single-sided negative electrode, a positive electrode, and a negative electrode are sequentially stacked in a state in which separators are disposed therebetween, or a 2C-type bi-cell, which is configured to have a structure in which a negative electrode, a positive electrode, and another negative electrode are sequentially stacked in a state in which separators are disposed therebetween.

6. The electrode assembly according to any one of claims 2 to 5, wherein the first unit cell is a bi-cell, the 2n-th unit cell is a 1A-type bi-cell, and a (2n−1)-th unit cell is a first full cell.

7. The electrode assembly according to any one of claims 2 to 5, wherein the first unit cell is a bi-cell, the 2n-th unit cell is a 1C-type bi-cell, and a (2n−1)-th unit cell is a second full cell.

8. The electrode assembly according to any one of claims 2 to 5, wherein the first unit cell is a bi-cell, the 2n-th unit cell is a first full cell, and a (2n−1)-th unit cell is a 1A-type bi-cell.

9. The electrode assembly according to any one of claims 2 to 5, wherein the first unit cell is a bi-cell, the 2n-th unit cell is a second full cell, and a (2n−1)-th unit cell is a 1C-type bi-cell.

10. The electrode assembly according to claim 1, wherein the single-sided electrode is a first positive electrode.

11. The electrode assembly according to claim 1, wherein the single-sided electrode is a first negative electrode.

12. A secondary battery comprising an electrode assembly according to claim 1 mounted in a battery case.

13. The secondary battery according to claim 12, wherein the battery case is a pouch-shaped case made of an aluminum laminate sheet or a can-shaped case.

14. A battery pack comprising a secondary battery according to claim 13 as a unit cell.

15. A device comprising a battery pack according to claim 14 as a power source.

16. The device according to claim 15, wherein the device is a mobile electronic device, a power tool driven by a battery-powered motor, an electric automobile, such as such as an electric vehicle (EV), a hybrid electric vehicle (HEV), or a plug-in hybrid electric vehicle (PHEV), an electric two-wheeled vehicle, such as an electric bicycle (E-bike) or an electric scooter (E-scooter), an electric golf cart, or a power storage system.

* * * * *